United States Patent
Carrick et al.

(10) Patent No.: US 7,110,682 B2
(45) Date of Patent: *Sep. 19, 2006

(54) METHOD AND APPARATUS FOR MAINTAINING A PRE-DETERMINED RATIO OF A PILOT TONE POWER AND A MEAN OPTICAL OUTPUT POWER OF AN OPTICAL SIGNAL

(75) Inventors: John C. Carrick, Wakefield, MA (US); Stuart D. Brorson, Marlborough, MA (US); Eric J. Frankfort, Yorktown Heights, NY (US); Paul C. Talmadge, Ansonia, CT (US); Roger P. Holmstrom, St. Charles, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/199,495

(22) Filed: Aug. 8, 2005

(65) Prior Publication Data
US 2005/0286890 A1 Dec. 29, 2005

Related U.S. Application Data

(63) Continuation of application No. 09/567,576, filed on May 10, 2000, now Pat. No. 6,931,214.

(51) Int. Cl.
*H04B 10/04* (2006.01)
(52) U.S. Cl. .................. 398/198; 398/197
(58) Field of Classification Search ........... 398/198, 398/197, 195
See application file for complete search history.

(56) References Cited

U.S. PATENT DOCUMENTS

| | | | |
|---|---|---|---|
| 5,161,044 A | 11/1992 | Nazarathy et al. | |
| 5,162,936 A | 11/1992 | Taga et al. | |
| 5,321,543 A | 6/1994 | Huber | |
| 5,343,324 A | 8/1994 | Le et al. | |
| 5,402,433 A | 3/1995 | Stiscia | |
| 5,513,029 A | 4/1996 | Roberts | |
| 5,526,164 A | 6/1996 | Link et al. | |
| 5,532,867 A | 7/1996 | Hayes et al. | |
| 5,809,049 A | 9/1998 | Schaefer et al. | |
| 5,850,409 A | 12/1998 | Link | |
| 6,122,302 A | 9/2000 | Dean | |
| 6,128,111 A * | 10/2000 | Roberts | 398/29 |
| 6,188,508 B1 | 2/2001 | Horiuchi et al. | |
| 6,931,214 B1 * | 8/2005 | Carrick et al. | 398/198 |

OTHER PUBLICATIONS

Hill, et al., "A Transport Network Layer Based on Optical Network Elements", *Journal of Lightwave Technology*, vol. 11, No. 5/6, May/Jun. 1993, pp. 667-679.

Y. Hamazumi, et al. "Transmission Capacity of Optical Path Overhead Transfer Scheme Using Pilot Tone for Optical Path Network", *Journal of Lightwave Technology*, vol. 15, No. 12, Dec. 1997, pp. 2197-2205.

* cited by examiner

*Primary Examiner*—Shi K. Li
(74) *Attorney, Agent, or Firm*—Davis & Associates; William D. Davis

(57) ABSTRACT

Methods and apparatus for maintaining a pre-determined ratio of a pilot tone power and a total mean optical power of an optical signal are provided. One apparatus includes an optical source coupled to provide an optical signal in response to a DC bias and an AC bias corresponding to a pilot tone signal. A processor is coupled to compute each of an AC component and a DC component of the optical signal from the same digitally sampled signal. A feedback control is coupled to vary at least one of the DC bias and the AC bias in accordance with a difference between a pre-determined value and a ratio of the AC and DC components.

20 Claims, 4 Drawing Sheets

METHOD AND APPARATUS FOR MAINTAINING A PRE-DETERMINED RATIO OF A PILOT TONE POWER AND A MEAN OPTICAL OUTPUT POWER OF AN OPTICAL SIGNAL

CROSS-REFERENCE TO RELATED APPLICATIONS

This application is a continuation of application Ser. No. 09/567,576 filed on May 10, 2000, now U.S. Pat. No. 6,931,214.

FIELD OF THE INVENTION

This invention relates to the field of optical communications networks. In particular, this invention is drawn to maintaining a pre-determined ratio between pilot tone power and a mean optical output power of an optical signal.

BACKGROUND OF THE INVENTION

Optical communications networks are used to transport large amounts of voice and data through fiber optic cables. Wave-division multiplexing (WDM) can be used to transmit multiple channels of optical information through the same fiber optic cable. Multiple channels are carried in the same fiber by assigning different optical wavelengths to each channel.

The optical signals degrade over distance such that re-generation or re-amplification may be required. Moreover, the channels within a fiber tend to degrade at different rates. The total mean output power is frequently used as an indicator of signal degradation. Optically amplifying the signals to maintain the total mean output power at a constant is not particularly effective due to the differences in degradation between channels. Moreover, increasing the amplification gain to maintain a constant mean output power without regard to individual channels can create significant distortions on an individual channel basis. Increasing gain to compensate for the loss of a few channels may result in too much amplification for the remaining channels individually even though the total mean power output remains constant. Accordingly, determination and regulation of optical power on a channel-by-channel basis is desirable.

In order to measure optical power on a channel-by-channel basis, an identifying pilot tone is superimposed upon each channel. Within a given fiber the pilot tones are unique in order to distinguish all channels for the purpose of power calculations. Given that the pilot tone and the channel signal originate from the same source, the optical channel power can be inferred from the pilot tone power and its fixed modulation depth at the source. The optical channel power can then be used to adequately control the optical amplifiers in the network.

One technique for setting the pilot tone power and a modulation depth at the source uses an open loop control. Open loop controls, however, cannot automatically accommodate optical sources such as laser diodes that have operating characteristics that may vary significantly with age. Differences between the actual and presumed values of the pilot tone power and modulation depth at the source can significantly affect the accuracy of the estimated or inferred optical channel power thus inhibiting efficient operation of the communications network.

SUMMARY

In view of limitations of known systems and methods, various methods and apparatus related to maintaining a pre-determined ratio of a pilot tone power and a mean optical power of an optical signal are provided.

One method includes generating an optical signal in accordance with an AC bias and a DC bias. The AC bias corresponds to a pilot tone signal. A detection path for the optical signal is provided. The detection path provides a digitally sampled signal representing the optical signal. The AC component and the DC component of the optical signal are determined using the same digitally sampled signal. At least one of the DC bias and the AC bias is varied in accordance with the difference between a pre-determined value and a ratio of the AC and DC components.

One apparatus includes an optical source coupled to provide an optical signal in response to a DC bias and an AC bias corresponding to a pilot tone signal. A processor is coupled to compute each of an AC component and a DC component of the optical signal from the same digitally sampled signal. A feedback control is coupled to vary at least one of the DC bias and the AC bias in accordance with a difference between a pre-determined value and a ratio of the AC and DC components.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
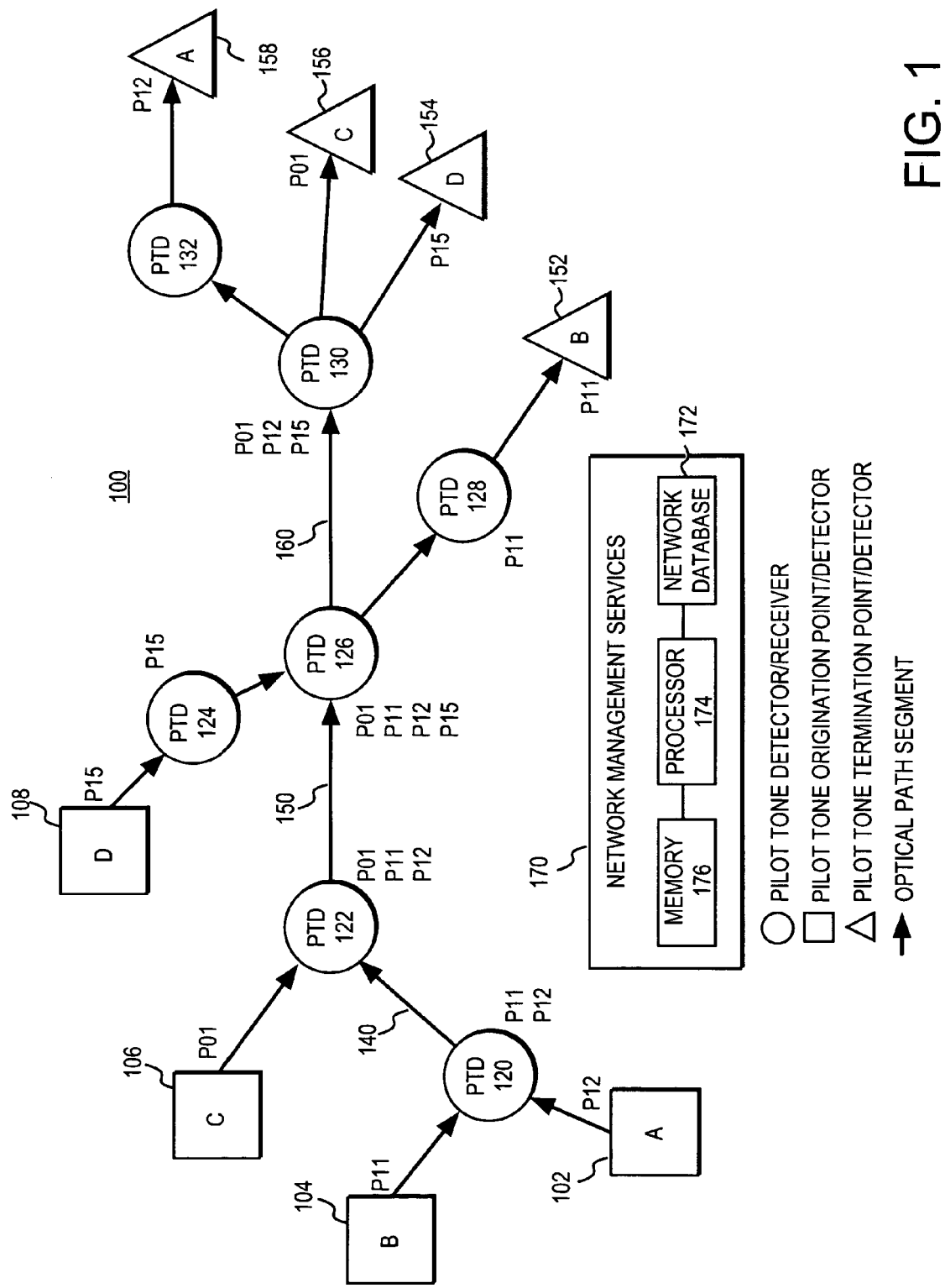
FIG. 1 illustrates one embodiment of an optical network.

FIG. 1 illustrates one embodiment of an optical network 100. The network includes a plurality of nodes identified as pilot tone origination points 102–108. Each pilot tone origination point is connected to the optical network through an optical path segment such as 140. The optical path segments comprise one or more optical fibers. The direction of the optical signal transmission is also illustrated.

Before terminating in pilot tone termination points such as 152–158, the optical signals typically pass through a number of nodes. Throughout the network, pilot tone detection nodes such as 120 couple the optical signals to optical paths incorporating other network pilot tone detection nodes (e.g., 122–132) and ultimately to pilot tone termination nodes 152–158. Pilot tone origination or source nodes (e.g., 106) are coupled to a pilot tone termination node (e.g., 156) through one or more detection nodes (122, 126, 130) and optical path segments (140, 150, etc.). Together these components form a selectable optical path.

Each of the nodes 102–108, 120–132, and 152–154 is capable of scanning the optical signal to identify the presence of any pilot tones. The pilot tones associated with a particular node are indicated near the node as appropriate. Pilot tones associated with a pilot tone origination point indicate the pilot tones being transmitted. Pilot tones associated with a pilot tone detector or a pilot tone termination point indicate the pilot tones being received. PTD 126, for example, is receiving pilot tones identified as P01, P11, P12, and P15.

Network management services 170 maintain a database 172 identifying the physical configuration of the network such as optical channel source and destination nodes as well as the interconnection (e.g., 140, 150, 160) of the nodes. Processor 174 retrieves program code from memory 176 for execution. The processor is capable of querying or updating the database 172 in accordance with instructions stored in memory 176. This database is particularly useful when physically modifying the network such as to move, replace, add, or remove nodes or interconnections between nodes. Connections between network management services 170 and the remainder of the optical network 100 are not shown so as not to obscure the example.

The use of pilot tones to identify individual channels within a fiber also enables identifying configuration errors in the database or connectivity errors in the network. In addition, detection of the optical paths provides a diagnostic tool for locating missing optical signals or resolving extra optical signals in the network 100. The measured optical power of the pilot tones are also used to infer the total mean optical signal power of a particular channel. Knowledge of the total mean optical output power at various points of the network is useful for performing network diagnostics as well as to facilitate transmission of the optical signals throughout the network. The measured optical power of a particular pilot tone is used to infer the mean optical power of the particular channel that pilot tone is associated with.

The pilot tone origination nodes generate the pilot tone by modulating an optical source. Typically, the optical source is a laser. The laser is provided with a DC source bias and the pilot tone signal is superimposed as an AC source bias. Data is transmitted by further modulation of the optical signal. In an open loop control scheme, the DC bias and the pilot tone signal amplitude are set to achieve a desired modulation index, total optical output power, and ratio of pilot tone optical output power to total optical output power without the benefit of feedback to regulate these parameters.

Sources of open loop response error include variations in the threshold current ($I_{th}$) required for the start of laser action. Another source of error is the nonlinear relationship between the laser output power ($P_o$) and the bias current ($I_b$) once $I_b$ is greater than $I_{th}$. Both of these effects vary with age. Errors in the open loop response contribute to inefficiencies in optical network communication. Examples of these inefficiencies include the need to set parameters with sufficient margins to accommodate aging or uncertainty.

Figure 2:
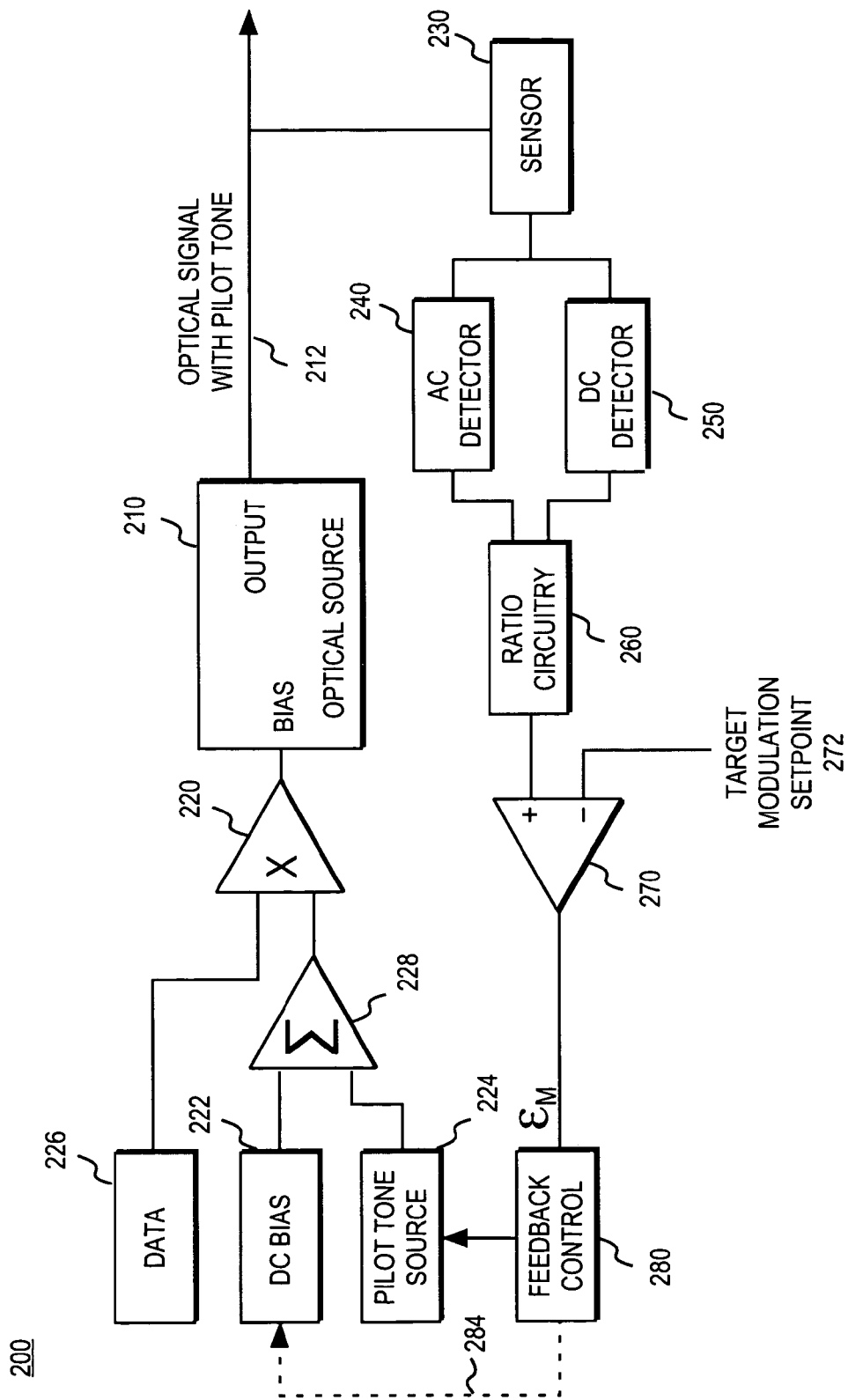
FIG. 2 illustrates one embodiment of an optical signal generation apparatus having a closed loop pilot tone to optical output power ratio control system.

FIG. 2 illustrates a closed loop pilot tone control system 200. The closed loop system manipulates at least a selected one of the pilot tone amplitude and the DC bias in accordance with an error signal corresponding to a difference between an actual ratio between the pilot tone (AC) and DC components of the optical signal and a target ratio. Thus either the pilot tone amplitude or the DC bias or both may be manipulated in accordance with the error signal.

The optical source 210 includes a bias input and an output 212. In one embodiment, optical source 210 generates predominately coherent optical signals. Alternatively, optical source 210 may provide non-coherent optical signals. In one embodiment, optical source 210 is a laser. In an alternative embodiment, optical source 210 comprises a light emitting diode.

A DC bias component is provided by DC bias 222. An AC component of the optical source bias is provided by pilot tone source 224. The AC and DC bias components are combined with summing amplifier 228. The data 326 and the output of summing amplifier 228 are provided to multiplier 320. The output of multiplier 320 is provided to the bias input of optical source 210. Optical source 210 generates an optical signal in accordance with the bias input. Accordingly, optical signal 212 includes a pilot tone provided by pilot tone source 224.

Sensor 230 provides an AC detector 240 and a DC detector 250 with an electrical signal corresponding to the sensed optical signal 212. In one embodiment, sensor 230 comprises a coupler, a buffer, and a PIN photodiode. Some optical sources such as lasers include a back-facet diode suitable for sensing the optical signal 212.

The AC detector and the DC detector determine the AC components and the DC components, respectively, of the optical signal generated by optical source 210. In one embodiment, the DC detector 250 is a low pass filter. Alternatively, the DC detector may be embodied as an analog-to-digital converter and digital signal processing to realize a low pass filter. In one embodiment, the AC detector 240 is a band pass filter combined with a diode detector. Alternatively, the AC detector may be embodied as an analog-to-digital converter and digital signal processing to realize a band pass filter and AC power detection.

The outputs of the AC detector 240 and the DC detector 250 are provided to ratio circuitry 260. Ratio circuitry 260 determines the ratio of the power or the amplitude of the AC component of the optical signal to the power or amplitude of the DC component of the optical signal, respectively. The ratio is compared with a target ratio corresponding to target modulation setpoint 272 using differential amplifier 270. The difference between the actual ratio as determined by the ratio circuitry 260 and the target modulation setpoint 272 is an error signal, $\epsilon_m$, which is processed by feedback control 280. Feedback control 280 provides a control input to at least a selected one of the DC bias 222 and the pilot tone source 224 (AC bias). In one embodiment, feedback control 280 comprises an integrator. In one embodiment, feedback control 280 comprises proportional, integral, and differential (PID) loop control.

In one embodiment, feedback control 280 provides a control input only to the pilot tone source. The amplitude of the pilot tone signal is controlled by the pilot tone source control input. Varying the amplitude of the pilot tone signal changes the index of modulation of the pilot tone signal.

In an alternative embodiment indicated by dotted line 284, feedback control 280 provides a control input to the DC bias exclusively to effectively control a ratio between the amplitude of the pilot tone source signal and the DC bias.

In another embodiment, feedback control 280 provides a control input to both the DC bias 222 and the pilot tone source 224 to control the index of modulation of the pilot tone source.

Various types of laser sources are available for optical source 210. In one embodiment, optical source 210 is an electro-absorptive (EA) laser. The first order response of the back-facet diode of an EA laser is substantially independent of the on-off keyed data communicated by the laser. Thus the on-off keyed data does not affect calculation of the AC component of the optical signal attributable to the pilot tone signal. The back-facet diodes of other laser types, however, sense the on-off keyed data thus complicating the determination of the AC component attributable to just the pilot tone signal when data is being transmitted.

For example, the back-facet diode of a direct modulated (DM) laser senses an optical signal including the pilot tone signal and any data being transmitted. As a result, analog AC detection must be optimized differently between EA and DM lasers.

Figure 3:
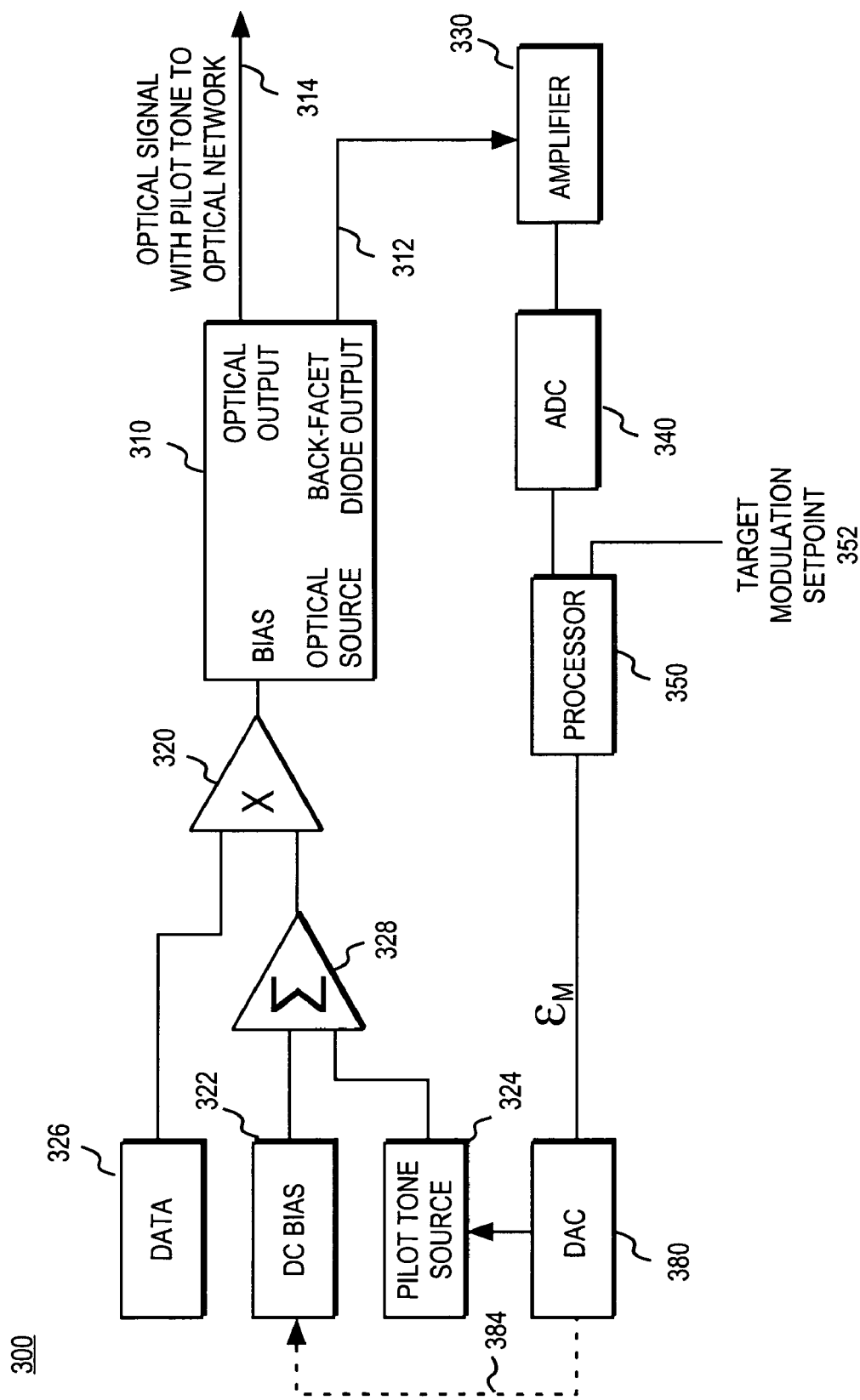
FIG. 3 illustrates one embodiment of an optical signal generation apparatus having a closed loop pilot tone to optical output power ratio control system with common AC and DC control loop portions.

FIG. 3 illustrates apparatus 300 including analog-to-digital conversion and digital signal processing (DSP) techniques for controlling the pilot tone signal amplitude. DC bias 322 and pilot tone source 324 (AC bias) are combined using summing amplifier 328. The data 326 and the output of the summing amplifier 328 are combined using multiplier 320. The output of multiplier 320 is provided to the bias input of optical source 310. Optical source 310 generates an optical signal 312 including the pilot tone signal in accordance with the optical source bias input. In various embodiments, the optical source 310 is a non-coherent light source such as a light emitting diode. Alternatively, optical source 310 may be a coherent light source such as an EA or a DM laser.

In this embodiment, the optical source 310 provides a back-facet diode output 312 distinct from the optical signal 314 otherwise intended for the optical network such that a separate external sensor is not required. Thus, optical sensing is accomplished using the back-facet diode of the optical source 310. The back-facet diode output 312 from optical source 310 is provided to amplifier 330. In one embodiment, amplifier 330 is a DC coupled transimpedance amplifier. In one embodiment, amplifier 330 includes filtering and buffering circuitry.

After the amplification stage, the signal is then provided to an analog-to-digital converter (ADC) 340. The digital output of ADC 340 is provided to processor 350 to generate the appropriate feedback values. Processor 350 calculates the AC and DC components of the optical signal 312 and determines the ratio. Processor 350 further computes a feedback value based on the difference between the target modulation setpoint 352 and the calculated ratio.

The digital feedback value is provided to digital-to-analog converter (DAC) 380 to generate an analog signal for controlling the pilot tone source 324. In particular, the amplitude of the pilot tone signal is varied in accordance with the output of DAC 380. In one alternative embodiment, the processor 350 and DAC 380 may instead provide control for the DC bias 322 as indicated by dotted line 384. Alternatively, the processor 350 and DAC 380 may provide control for both the DC bias 322 and the pilot tone source 324.

In contrast to the analog approach of FIG. 2, one advantage of the digital signal processing approach is that the same control loop portions are used for both AC and DC detection. The use of the same hardware for AC and DC detection is advantageous because it minimizes signal path differences that otherwise contribute to errors that limit the accuracy of the closed loop control. Another advantage of the DSP approach is that any differences between applications for different types of optical sources (e.g., EA and DM lasers) can be accommodated without a change in hardware.

Figure 4:
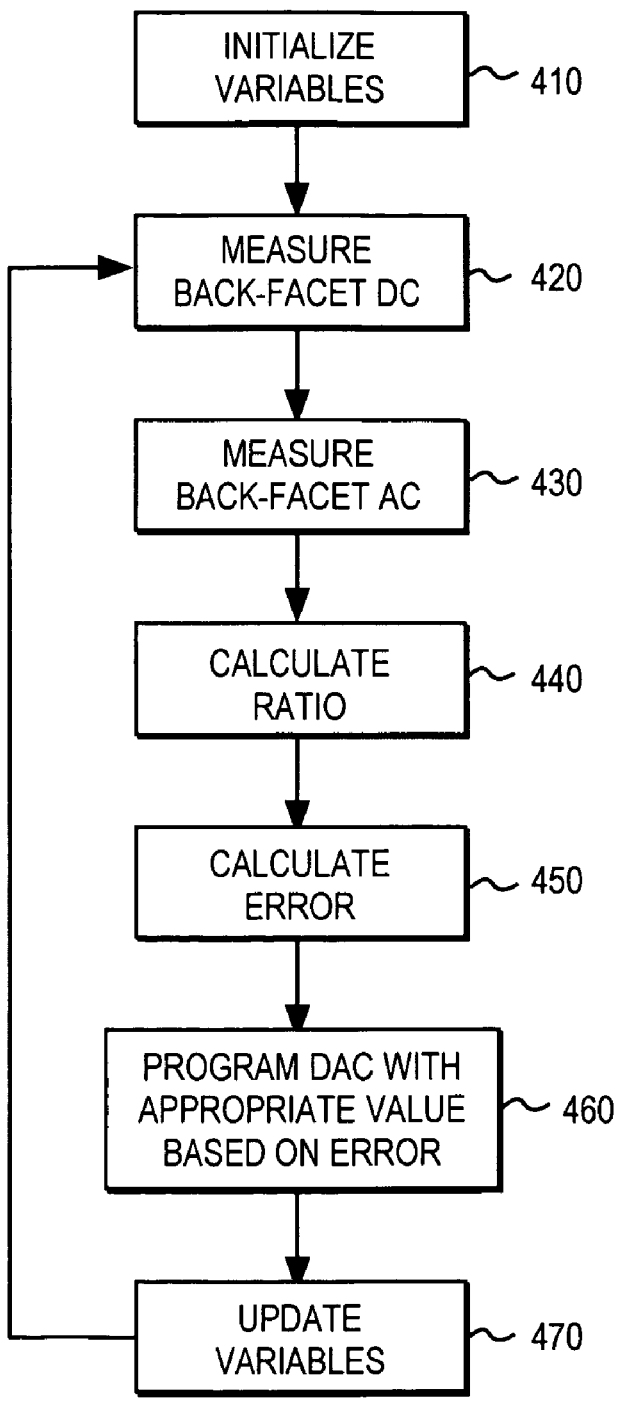
FIG. 4 illustrates one embodiment of a method of programming the control loop of FIG. 3.

FIG. 4 illustrates one embodiment of a method used by processor 350 to determine the appropriate feedback values. In step 410, variables are initialized. In step 420, samples are taken from the ADC for measuring the DC component. The DC component can be calculated by averaging the ADC samples, for example.

In step 430, samples are taken from the ADC for measuring the AC component. In one embodiment, the AC component is calculated as the average root mean square value of the filtered AC.

In step 440, a ratio between AC and DC components is calculated to determine percent modulation. The error is then calculated as the difference between the calculated percent modulation and the pre-determined threshold value in step 450. Once the error is determined, the DAC may be programmed with appropriate values corresponding to the error in 460. Any other variables may then be updated in step 470. Steps 420–470 are performed continuously as long as monitoring is desired.

The method set forth in FIG. 4 may be implemented using processor executable instructions provided to the processor by a storage medium. In particular, the storage medium stores processor executable instructions for controlling the modulation index of the pilot tone signal, wherein upon execution, the processor executable instructions instruct the processor to perform the steps set forth in FIG. 4. Examples of storage mediums suitable for storing the processor executable instructions include volatile storage mediums such as random access memory as well as nonvolatile storage mediums such as read only memories, compact disks, magnetic disks, and magnetic tape.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of controlling a pilot tone signal, comprising the steps of:
    a) providing a detection path that provides a digitally sampled signal representing an optical signal, wherein the optical signal comprises a pilot tone signal;
    b) determining an AC component and a DC component of the optical signal from the same digitally sampled signal;
    c) calculating a ratio of the AC and DC components; and
    d) varying an amplitude of a pilot tone signal in accordance with a difference between the calculated ratio and a pre-determined value.

2. The method of claim 1 wherein the DC component is calculated as an average of samples from the digitally sampled signal.

3. The method of claim 1 wherein the AC component is calculated as an average root mean square value.

4. A method comprising the steps of:
    a) generating an optical signal in accordance with an AC bias corresponding to a pilot tone signal and a DC bias;
    b) providing a detection path that provides a digitally sampled signal representing the optical signal;
    c) determining an AC component and a DC component of the optical signal using the same digitally sampled signal; and
    d) varying at least one of the DC bias and the AC bias in accordance with a difference between a pre-determined value and a ratio of the AC and DC components.

5. The method of claim 4 wherein step d) comprises varying only the DC bias.

6. The method of claim 4 wherein step d) comprises varying only the AC bias corresponding to the amplitude of the pilot tone signal.

7. The method of claim 4 wherein step d) comprises varying both the DC bias and the AC bias.

8. The method of claim 4 wherein the DC component is calculated as an average of samples from the digitally sampled signal.

9. The method of claim 4 wherein the AC component is calculated as an average root mean square value.

10. The method of claim 4 wherein the optical signal is generated by one of an electro-absorptive laser and a direct modulation laser.

11. An apparatus comprising:
- an optical source coupled to provide an optical signal in response to a DC bias and an AC bias corresponding to a pilot tone signal;
- a processor coupled to compute each of an AC component and a DC component of the optical signal from a same digitally sampled signal; and
- a feedback control coupled to vary at least one of the DC bias and the AC bias in accordance with a difference between a pre-determined value and a ratio of the AC and DC components.

12. The apparatus of claim 11 wherein the feedback control varies only the DC bias.

13. The apparatus of claim 11 wherein the feedback control varies only the AC bias corresponding to the amplitude of the pilot tone signal.

14. The apparatus of claim 11 wherein the feedback control varies both the AC bias and the DC bias.

15. The apparatus of claim 11 wherein the optical source is one of an electro-absorptive laser and a direct modulation laser.

16. The apparatus of claim 11 further comprising a detection path to provide the digitally sampled signal to the processor, wherein the detection path comprises:
- a sensor providing an electrical signal corresponding to a sensed optical signal; and
- an analog-to-digital converter, wherein the analog-to-digital converter generates the digitally sampled signal from the electrical signal of the sensor.

17. The apparatus of claim 16 wherein the sensor comprises a PIN photodiode.

18. The apparatus of claim 16 wherein the sensor comprises a back-facet photodiode of the optical source.

19. The apparatus of claim 11 wherein the DC component is calculated as an average of samples from the digitally sampled signal.

20. The apparatus of claim 11 wherein the AC component is calculated as an average root mean square value.

* * * * *